3,103,508
**PROCESS FOR PREPARING AN ESTER OF AN
$\alpha,\beta$-UNSATURATED ACID AND A SUGAR**
Earl Eugene Fisher and James L. Harper, Decatur, Ill.,
assignors to A. E. Staley Manufacturing Company,
Decatur, Ill., a corporation of Delaware
No Drawing. Filed May 23, 1960, Ser. No. 30,731
24 Claims. (Cl. 260—234)

This invention relates to polymerizable compounds formed from sugars and particularly to monofunctional esters formed between sugars and alditols (and certain ketals thereof) and $\alpha,\beta$ unsaturated polymerizable acids.

An object of this invention is to provide valuable monomeric materials from sugars—an abundant and inexpensive raw material.

Sugars have been used in the past to prepare polymers formed by condensation. That is to say, sugars, being polyalcohols, are known to condense under certain conditions with polycarboxylic acids to form polyesters. Also, polyfunctional sugar esters of an $\alpha,\beta$ unsaturated acid have been prepared but these condensed under free radical initiation to give hard, brittle, intractable resins. This is to be expected; the polyfunctional character of such compounds produces cross-linking during polymerization. It has now been discovered that the monofunctional compounds, according to this invention, polymerize under free-radical initiation to soluble, fusible polymers.

In preparing these monomers, all but one of the hydroxyl groups of the sugar are first reacted with a ketone to form the ketal (the arylidene or alkylidene derivative). Then the remaining alcohol group is reacted in the presence of a polymerization inhibitor with an $\alpha,\beta$ unsaturated polymerizable acid to form an ester. The resulting compound is polymerizable. One of the ketone groups is selectively removed, and the resulting monoketal is polymerizable. Finally, with both ketone groups removed, the resulting compound is polymerizable to yield soluble uncrosslinked polymers.

The new compounds include the carbohydrate monoesters of $\alpha,\beta$ unsaturated polymerizable acids of up to five carbon atoms. These acids are typically represented by the formula:

$$R_1-\underset{\underset{H}{|}}{C}=\underset{\underset{R_2}{|}}{C}-\underset{\underset{}{||}}{\overset{O}{C}}-OH$$

in which $R_1$ is hydrogen, carboxyl or esterified carboxyl, and $R_2$ is hydrogen, alkyl of up to two carbon atoms, alkoxy of up to two carbon atoms, carboxymethyl, nitrile or halide. Such acids include acrylic, methacrylic, $\alpha$-chloroacrylic, $\alpha$-cyano acrylic, maleic, half esters of maleic, fumaric, half esters of fumaric, $\alpha$-ethacrylic, itaconic and half esters of itaconic. The preferred acids of the novel ester are acrylic and methacrylic. In the case of the dicarboxylic acids maleic, fumaric and itaconic, the monomer of this invention is normally the biscarbohydrate ester, i.e., both carboxyl groups are esterified.

The structure of the ester of the $\alpha,\beta$ unsaturated monocarboxylic acid is typically represented by the formula:

$$H_2C=\underset{\underset{R_3}{|}}{C}-\underset{\underset{}{||}}{\overset{O}{C}}-OS$$

in which $R_3$ is selected from the group hydrogen, alkyl of up to two carbon atoms, alkoxy of up to two carbon atoms, nitrile and halide and S is the sugar molecule. The structure of the ester of the itaconate diesters is represented by the following formula, S representing the sugar molecule:

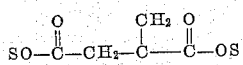

The structure of the fumaric and maleic diesters is represented by the following formula with S representing the sugar molecule:

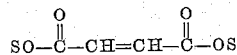

The preferred polymerizable esters are those of the monocarboxylic acids identified above.

The carbohydrate portion of the esters is composed of a sugar of six carbon atoms, an alditol of five carbon atoms or a mono- or diketal of such sugar or alditol. Of the sugars, D-glucose is preferred, but others can be used, such as fructose, galactose, sorbose, and so on. The five-carbon-atom alditols are exemplified by xylitol and ribitol.

The useful sugars (or alditols) are those which readily form the diketal derivatives, and, with only one exception known to us, the characteristic property of such sugar molecules is that they contain in one or more of their isomeric forms two pairs of cis hydroxyl groups on contiguous carbon atoms. Frequently, as in the case of D-glucose, it is only one of the isomeric forms that has this structure. In the case of D-glucose, it is the glucofuranose isomer which has available the necessary two pair of cis hydroxyl groups. Similarly D-mannose provides two pairs of cis hydroxyl groups only in the furanose form. On the other hand, D-fructose has the necessary pairs of cis hydroxyls in the fructopyranose isomer and this produces two isomeric diketal derivatives, exemplified by 1,2:3,4-di-O-isopropylidene-D-fructose and 2,3:4,5-di-O-isopropylidene-D-fructose. Xylitol forms the 1,2:4,5-diisopropylidene derivative. The monoketals are formed by the selective removal of one of the ketone groups. These compounds are exemplified by 1,2-O-isopropylidene-D-glucose, 1,2-O-isopropylidene-D-fructose, 2,3-O-isopropylidene-D-fructose, etc. The exceptional sugar is sorbose, which readily forms 2,3:4,6-di-O-isopropylidene-L-sorbose, i.e., in this case the diketal forms with one pair of carbon atoms that are contiguous and one pair that are not.

The diketal derivatives of the sugars are known to be formed not only from acetone, which yields the isopropylidene compounds, but from other ketones as well, such as methyl ethyl ketone, methyl propyl ketone, monochloracetone and cyclohexanone. The preparation of such compounds and their isolation is well known.

The compounds of this invention are monofunctional as respects vinyl polymerization since each of the compounds has only one acyl group containing vinyl unsaturation. (This acyl group may be on a primary or a secondary hydroxyl group.) As a result, there is little or no tendency for free-radical polymerization to produce cross-linking and resultant hard, brittle, insoluble, infusible polymers.

The novel compounds of this invention have their desirable monomeric properties regardless of the method of preparation. While several methods are useful in the preparation, the process of the present invention is an efficient, selective method particularly suited to the transesterification of the diketal derivatives of six-carbon-atom sugar molecules and five-carbon-atom alditols of this invention. The process may be termed an alcoholysis of an ester of an $\alpha,\beta$ unsaturated acid with the diketal derivative of the sugar, such as diacetone glucose. The desirable reagent esters are those of lower hydrocarbon alcohols since during the alcoholysis the alcohol must be removed from the reaction mixture as it is formed. Preferably the reactant ester is ethyl acrylate or methyl methacrylate although other esters of acrylic or methacrylic acid are also useful, e.g., butyl methacrylate, 2-ethylhexyl acrylate, etc. The reaction takes place in the presence of a polymerization inhibitor in a concentration to suppress polymerization of the unsaturated ester and tetraisopropyl titanate as catalyst.

As the alcoholysis proceeds, an alcohol is liberated in the reaction mixture, e.g., ethanol from ethyl acrylate, methanol from methyl methacrylate, butanol from butyl methacrylate and so on. This alcohol is removed from the reaction mixture as it is formed to shift the equilibrium toward the formation of the sugar ester. This is conveniently done by using a solvent that forms an azeotrope with the alcohol, the azeotrope having a lower boiling point than the ester from which the alcohol is formed. Most conveniently, the solvent may simply be an excess of the reactant ester (e.g., ethyl acrylate or methyl methacrylate) and the alcohol is removed as the azeotrope of such ester. Alternatively, an inert solvent for the diketal sugar and reactant ester may be used, and of these, the most useful solvents form an azeotrope with the liberated alcohol. The preferred inert solvents are hydrocarbons, such as cyclohexane, the hexanes derived from petroleum, toluene, etc. To carry out the reaction, only the stoichiometric quantity of reactant ester is necessary, although a large excess is required when the reactant ester is also used as solvent. In the latter case, with diacetone glucose and ethyl acrylate or methyl methacrylate for example, the weight ratio of the glucose derivative to the ester lies in the range from about 1:5 to about 1:3. While lower ratios are satisfactory in permitting reaction, they are wasteful of reactant. Using the reactant ester as solvent has this additional advantage: the large excess present tends to drive the reaction further toward completion. In fact, it is desirable, for this purpose, to maintain at least a slight excess of reagent ester in the reaction mixture. For this reason, it is preferred to use the reagent ester as solvent for the reaction.

The presence of a polymerization inhibitor and its concentration are important to the method. Any of the compounds commonly used to inhibit or suppress polymerization of vinyl monomers can be used. These include hydroquinone, p-methoxyphenol, p-phenylene diamine, catechol, picric acid, trinitrobenzene, 2,5-dihydroxy-1,4 benzoquinone, chloranil, 9,10-phenanthroquinone, t-butyl catechol, and similar compounds. Those that produce a color in the product, such as hydroquinone, are not preferred. Similarly, the yield of product depends somewhat on the effectiveness of the inhibitor, and therefore the concentration of the inhibitor must be varied to take this into account. The concentration of inhibitor also depends on the rate of reaction which, in turn, is dependent in part on the catalyst concentration. While as little as 0.5% of the inhibitor by weight of the reactant ester can be used, the preferred concentration is 1% to 5%.

We have discovered that the catalyst in accordance with this invention, tetraisopropyl titanate, is markedly superior to other catalysts often used in alcoholysis reactions, such as sodium methoxide and p-toluene sulfonic acid. Furthermore, we have discovered, that a certain concentration of catalyst is necessary to the reaction. The necessary concentration is at least 1% by weight of the reactant ester and must be in excess of the stoichiometric concentration with respect to the polymerization inhibitor. It is desirable to keep the titanate catalyst concentration to a minimum (i.e., a slight excess over the inhibitor concentration) to avoid filtration difficulties with the gelatinous, hydrous titanium oxides formed when the catalyst is decomposed, and, for this reason, it is desirable to avoid using more than 5%.

The reaction is carried out at a temperature sufficient, at the minimum, to distill the alcohol of the reactant ester from the reaction mixture as formed. The temperature must, of course, be below the boiling point of the reagent ester. The removal of the alcohol of the reagent ester is best accomplished by using a solvent that forms an azeotrope with the alcohol and performing the reaction at a temperature above the boiling point of the azeotrope. For example, when ethyl acrylate is used as reagent and solvent, the alcohol is removed as the ethyl acrylate-ethanol azeotrope and the reaction temperature is suitably about 100° C. With methyl methacrylate, the methyl methacrylate-methanol azeotrope is used to remove the alcohol, and the reaction temperature is suitably near 80° C. Similar temperatures are used when an inert solvent is employed. For example, cyclohexane, mixed hexanes and toluene all form azeotropes with methanol that are readily distilled from the methyl methacrylate reaction mixture at temperatures above 54° C., 50° C. and 64° C., respectively. The maximum temperature is limited by the decomposition and boiling points of the reactants.

Alcoholysis reactions of this type are ordinarily difficult when the hydroxyl group is secondary. Surprisingly, however, the process of this invention is easily performed with secondary hydroxyl groups, as exemplified by glucofuranose.

The following examples illustrate this invention with the understanding that the examples are illustrative only. In the examples all parts and percentages are by weight.

EXAMPLE 1

*Preparation of Diacetone Glucose*

In accordance with the procedure of Glen et al. Patent No. 2,715,121, issued August 9, 1955, 300 grams of anhydrous glucose were suspended in two liters of acetone in a flask equipped with a reflux condenser and stirrer. At room temperature, 240 grams of pulverized anhydrous zinc chloride and 8 grams of 85% phosphoric acid were added, and the solution was stirred vigorously at room temperature for 24 hours. Just after the addition of the zinc chloride, the acetone refluxed and the refluxing continued for about 30 minutes. The reaction mixture was permitted to cool to room temperature and after 24 hours the unreacted glucose was separated from the solution by filtration and washed with acetone. The acetone solution was made alkaline (pH 8) by adding 50% sodium hydroxide while using an ice bath to keep the solution below 20° C. Zinc hydroxide precipitated from the acetone solution and was separated by filtration and washed with acetone. The combined acetone filtrate and washings were evaporated under reduced pressure to substantial dryness. Then 300 ml. of chloroform and 300 ml. of water were added to the solid residue. After shaking, the chloroform layer was separated, and the water layer was extracted twice more with chloroform. The combined extract was washed with water and then dried over anhydrous sodium sulfate. Evaporation of the chloroform under reduced pressure to substantial dryness produced a crystalline solid, which was recrystallized from a petroleum hydrocarbon solvent. The yield from this procedure has consistently been between 45 and 55%, and the diacetone glucose crystals have a melting point of 110 to 111° C.

EXAMPLE 2

*Preparation of 3-Acrylyl Diacetone Glucose*

In a flask equipped with a packed column and a variable takeoff distilling head, there were placed 26 grams of diacetone glucose (prepared as described in Example 1), 150 cc. of ethyl acrylate, 5 grams of p-methoxyphenol and 5 cc. of tetraisopropyl titanate. The flask and the remainder of the apparatus was flushed with nitrogen, and a nitrogen atmosphere was maintained throughout the course of the reaction.

The reaction mixture was heated to the boiling point of ethyl acrylate while being stirred. During the course of the reaction the ethyl acrylate-ethanol azeotrope was collected at the distilling head until the temperature of the distillate was 90° C. This required about two hours. At the conclusion of the reaction, 20 cc. of water and 100 cc. of a purified hydrocarbon solvent were added to the refluxing reaction mixture, and the resulting solution was stirred and then allowed to cool to room temperature. The gelatinous reaction product was separated by centrifuging, the supernatant liquid was decanted and the solid was washed twice by re-slurrying with the hydrouct in the manner described in Examples 4 and 6, respectively.

EXAMPLE 9

Alternate Preparation of 3-Acrylyl Diacetone Glucose

While maintaining anhydrous conditions, 26 grams of diacetone glucose (prepared as described in Example 1) was mixed with 250 cc. of liquid ammonia, and 2.3 grams of metallic sodium was added in small pieces over a period of about an hour. The ammonia was removed by evaporation and replaced with anhydrous ether. Then the ether was distilled from the reaction until the distillate was no longer alkaline to the moist litmus vapor. Ether was added to bring the volume to about 250 cc., and then 9.0 grams of acrylyl chloride, dissolved in 100 cc. of anhydrous ether, was added over a period of about one hour with vigorous stirring. The solution was maintained at reflux for 30 minutes and then cooled to precipitate the sodium chloride formed in the reaction. The sodium chloride was separated by filtration, and the ether solution was washed with 5% sodium bicarbonate and then with water and finally dried over anhydrous sodium sulfate. The evaporation of the ether left a heavy viscous syrup having an infrared absorption spectrum that confirmed the structure as 3-acrylyl diacetone glucose. The yield was essentially quantitative.

EXAMPLE 10

Polymerization of 3-Acrylyl Diacetone Glucose Produced by Alternate Method

Each of two 10 gram samples of the product of Example 9 was dissolved in 30 cc. of anhydrous benzyene. To one sample 0.024 gram of benzoyl peroxide was added and to the other sample 0.023 gram of azobisisobutyronitrile. The samples were maintained at 70° C. overnight and the polymer formed was precipitated by pouring each of the solutions into 150 ml. of a purified hydrocarbon solvent. The white granular polymer was collected by filtration.

From the benzoyl peroxide-catalyzed polymerization 6.8 grams of polymer was recovered with a softening point of 150 to 160° C. From the other sample 6.2 grams of polymer was recovered with the same softening point. The average analysis of the polymer was carbon, 57.62%; hydrogen, 7.13%.

EXAMPLE 11

Preparation of Bis (Diacetone Glucose) Itaconate

Following the method of this invention, 26 grams of diacetone glucose (prepared by the method of Example 1), 7.9 grams of dimethyl itaconate, 150 cc. of benzene and 5 cc. of tetraisopropyl titanate were reacted under a nitrogen atmosphere. Temperature was first raised until the benzene boiled under reflux and the methanol-benzene azeotrope (boiling point 57.5° C.) was collected. The reaction was assumed complete when no additional methanol benzene azeotrope was collected (approximately four hours). While the reaction was still refluxing, 20 cc. of water was added to decompose the tetraisopropyl titanate. The precipitated titanium oxide was separated by centrifuging and the benzene was evaporated from the reaction mixture initially with a water aspirator and finally at 2 mm. pressure overnight under a stream of nitrogen. The resulting syrupy reaction product weighed 29.1 grams, a yield of 90%. The product was analyzed by its infrared spectrum and thereby confirmed as the biscarbohydrate ester of an itaconic acid.

In some cases acetal derivatives may be substituted for the ketal derivatives already described. However, for reducing sugars, the acetals are generally more difficult to prepare and we therefore prefer the ketals. Acetal derivatives of non-reducing sugars, however, are relatively easy to prepare. Acetal derivatives are prepared, for example, with acetaldehyde, benzaldehyde, ring-substituted benzaldehyde (e.g., o-, m- or p-nitrobenzaldehyde, o-, m- or p-chlorobenzaldehyde, p-methoxybenzaldehyde, p-methylbenzaldehyde, etc.), chloracetaldehyde, butyraldehyde, amyl aldehyde, furfural, etc.

While the sugars and alditols of this invention are preferably those having two pair of cis hydroxyl groups on contiguous carbon atoms, it is possible to prepare similar derivatives from sugars and alditols of other structures. However, the known procedures are so difficult and complex that they are entirely impractical. The one known exception to this rule is sorbose, as mentioned before, and the diketal of L-sorbose is easily prepared. This diketal reacts with esters of $\alpha,\beta$ unsaturated acids in the presence of the titanium catalyst of this invention in essentially the same manner as D-glucose. In this case, however, the sugar molecule ester is formed on the hydroxyl in the 1-position.

The polymers formed from the monomers of this invention are useful as sizing agents for synthetic fibers and as protective colloids, for example, in polyvinyl acetate emulsions. The polymers also have utility as thickeners for latexes. The compounds of the invention are also useful as comonomers with other lower acrylic ester monomers to which they impart hardness and solvent resistance. These compounds are also useful as comonomers to impart freeze-thaw stability and sheer stability in resin emulsions.

Since many embodiments may be made of the invention and since many changes may be made in the embodiments described, the foregoing is to be interpreted as illustrative only and the scope of the invention is defined in the appended claims.

What is claimed is:

1. A polymerizable ester between one hydroxyl of a sugar molecule and an $\alpha,\beta$-unsaturated polymerizable carboxylic acid of up to five carbon atoms, said sugar molecule being selected from the group consisting of six-carbon-atom sugars, five-carbon-atom alditols and monoketals and diketals thereof, said ester having only one said carboxylic acid group said ester having a single vinylidene group and being homopolymerizable by free-radical initiation to yield a film-forming, soluble polymer.

2. The compound of claim 1 in which the sugar molecule is glucose.

3. The compound of claim 1 in which the acid is acrylic acid.

4. The compound of claim 1 in which the acid is methacrylic acid.

5. The compound glucose monoacrylate having a single vinylidene group and being homopolymerizable by free-radical initiation to yield a film-forming, soluble polymer.

6. The compound glucose monomethacrylate having a single vinylidene group and being homopolymerizable by free-radical initiation to yield a film-forming, soluble polymer.

7. The compound bisglucose monoitaconate.

8. The process of preparing an ester of an $\alpha,\beta$-unsaturated acid and a sugar molecule that comprises reacting the diketal of a sugar having six carbon atoms with a lower hydrocarbon ester of an $\alpha,\beta$-unsaturated polymerizable acid having up to five carbon atoms in the presence of a vinyl polymerization inhibitor and tetraisopropyl titanate as catalyst in an amount in excess of the stoichiometric concentration with respect to said inhibitor and distilling hydrocarbon alcohol from the reaction mixture as formed, said sugar being selected from the group of sugars consisting of sorbose and sugars having at least one isomeric form with two pair of cis hydroxyl groups on contiguous carbon atoms.

9. The method of claim 8 including the step of removing at least one of the ketal groups from the product of the reaction by hydrolysis.

10. The method of claim 8 in which the sugar molecule is diacetone glucose.

11. The method of claim 8 in which the lower hydrocarbon ester is an ester of acrylic acid.

carbon solvent and re-centrifuging. The centrifugate was combined with the hydrocarbon washings and washed successively with water, with 0.5 normal potassium hydroxide and with water. The hydrocarbon solvent was removed by evaporation at two millimeters' mercury pressure.

The crystalline residue was recrystallized by dissolving in 100 cc. of methanol, adding water until the solution became turbid and then refrigerating. The crystals were filtered from the methanol-water solution. Then additional water was added and the process repeated until the addition of water no longer made the methanol solution turbid. The dried crystalline product weighed 25.7 grams, a yield of 82%, and had a melting point of 77–8° C. The calculated analysis for 3-acrylyl diacetone glucose is carbon, 57.31; hydrogen, 7.05. The experiment was repeated and the analyses of the products of the two runs were: carbon, 57.77; hydrogen, 6.97 and carbon, 57.24; hydrogen, 6.70, respectively.

EXAMPLE 3

*Polymerization of 3-Acrylyl Diacetone Glucose*

Ten grams of the product of Example 2 was dissolved in 25 c.c. of benzene and 0.5% by weight benzoyl peroxide was added while maintaining a nitrogen atmosphere. The solution was stirred and kept at the reflux temperature for six hours under the nitrogen atmosphere. The solution was analyzed by means of infrared absorption, and the spectrum indicated that the conversion to polymer was approximately 87%. The Brookfield viscosity of the solution was 10.5 centipoises as measured with a No. 2 spindle at 30 r.p.m. The polymer was precipitated by pouring the benzene solution into 250 cc. of a purified hydrocarbon solvent, and 8.2 grams of white powder was obtained. The analysis was carbon, 57.62; hydrogen, 7.23. The polymer was film-forming from benzene solution.

EXAMPLE 4

*Preparation of Acrylyl Mono-Acetone Glucose*

While maintaining a nitrogen atmosphere, 10 grams of the 3-acrylyl diacetone glucose of Example 2, 0.1 gram of p-methoxy phenol, 40 cc. of ethanol and 16 cc. of 2 N sulfuric acid were heated to 50° C. by means of a water bath. The reaction mixture was maintained at 50° C. for 70 minutes and then cooled in a bath of crushed ice. While cooling, the reaction mixture was neutralized with 1 N sodium hydroxide. After evaporation to substantial dryness under reduced pressure, the solid product was extracted several times with warm ethyl acetate. Then the ethyl acetate was evaporated under reduced pressure, and the resulting crystalline solid was recrystallized from a mixture of ethanol and water in the manner described in Example 2. The yield was 6.3 grams (or 72%) and the product had a melting point of 135–6° C. The calculated analysis for acrylyl mono-acetone glucose is carbon, 52.53%; hydrogen, 6.60%. The analysis of the products of two trials of the method were: carbon, 52.74%; hydrogen, 6.50% and carbon, 52.61%; hydrogen, 6.51%, respectively.

EXAMPLE 5

*Polymerization of 3-Acrylyl Mono-Acetone Glucose*

While maintaining a nitrogen atmosphere, 10 grams of the product of Example 4 and 25 cc. of dioxane containing 0.5% benzoyl peroxide (based on the monomer) were heated by means of an 80° C. water bath for six hours. Infrared absorption studies of the resultant product indicated that conversion to polymer was approximately 90%. The Brookfield viscosity of the solution was 5.4 centipoises using a No. 2 spindle at 30 r.p.m. The polymer was isolated by pouring the dioxane solution into 250 cc. of water. The yield was 7.9 grams and the analysis of the polymer was carbon, 52.43%; hydrogen, 6.58%. The polymer was film-forming from a dioxane solution.

EXAMPLE 6

*Preparation of Glucose Acrylate*

A solution was prepared containing 10 grams of diacetone glucose acrylate, 50 cc. of water, 50 cc. of dioxane, 0.1 gram of p-methoxy phenol and 10 grams of wet acid-form ion exchange resin (Dowex-50). The solution, under a nitrogen atmosphere, was stirred and heated at reflux for two hours. Then the ion exchange resin was removed by filtration, and the filtrate was evaporated under reduced pressure to produce a heavy viscous syrup having an infrared and near infrared spectrum confirming that the product was glucose acrylate. Yield was 6.2 grams. The procedure was repeated varying the solvent and acid catalyst as indicated in Table 1.

TABLE 1.—PREPARATION OF GLUCOSE ACRYLATE FROM DIACETONE GLUCOSE ACRYLATE [1]

| Solvent | Acid catayst | Reaction conditions | Yield (grams) |
| --- | --- | --- | --- |
| 75% dioxane-25% $H_2O$, 100 c.c. | Dowex-50 (10 grams wet weight) | 2 hrs. at reflux of solvent | 7.0 (94%) (syrup). |
| 50% acetic acid, anhydrous-50% 1 N $H_2SO_4$, 200 c.c. | $H_2SO_4$ | Heat at 70° C. until all goes into solution. | 4.4 (59%) (syrup). |
| 80 c.c. ethyl acetate | 40 c.c. of conc. HCl | Room temperature for one hour | 6.8 (91.1%) (syrup). |
| 150 c.c. ethanol, 50 c.c. $H_2O$ | 2 g. oxalic acid | 2 hours at reflux of solvent | 6.7 (40%) (syrup). |
| 150 c.c. ethanol, 150 c.c. $H_2O$ | 2. g. oxalic acid | ----do---- | 5.4 (72%) (syrup). |
| 150 c.c. ethanol, 10 c.c. $H_2O$ | 1 g. oxalic acid | ----do---- | 6.7 (89%) (syrup). |

[1] All runs are with 10 grams of starting material.

EXAMPLE 7

*Polymerization of Acrylyl Glucose*

Under a nitrogen atmosphere, 10 grams of the product of Example 6 was heated at 80° C. for six hours with 25 cc. of dioxane and 0.5% benzoyl peroxide (based on the monomer). Infrared absorption studies indicated that the conversion to polymer was more than 90%. The Brookfield viscosity of the reaction product was 11.2 centipoises as measured with a No. 2 spindle at 30 r.p.m. The solid polymer was separated by evaporating the dioxane under reduced pressure. The polymer was soluble in water and was film-forming from water solution.

EXAMPLE 8

*Preparation of 3-Methacrylyl Diacetone Glucose by an Alternate Procedure*

A solution was prepared by dissolving 26 grams of diacetone glucose, produced in accordance with Example 1, in 150 cc. of anhydrous pyridine. After cooling this solution to 0° C., 17.0 grams of methacrylic anhydride was added dropwise over a period of about one hour. The solution was stirred and permitted to come to room tempearture where it was maintained for eight hours. The reaction product was then poured with vigorous stirring into 150 cc. of water containing ice. A heavy, viscous syrup separated from this solution, and it was analyzed by infrared absorption. The spectrum confirmed the structure as 3-methacrylyl diacetone glucose. One or both of the ketone groups can be removed from the prod- 12. The method of claim 8 in which the lower hydrocarbon ester is an ester of methacrylic acid.

13. The process of preparing a polymerizable ester that comprises reacting diacetone glucose with a lower hydrocarbon ester of acrylic acid in the presence of a vinyl polymerization inhibitor and tetraisopropyl titanate as catalyst in an amount in excess of the stoichiometric concentration with respect to said inhibitor and distilling the hydrocarbon alcohol from the reaction mixture as formed.

14. The process of preparing a polymerizable ester that comprises reacting diacetone glucose with a lower hydrocarbon ester of methacrylic acid in the presence of a vinyl polymerization inhibitor and tetraisopropyl titanate as catalyst in an amount in excess of the stoichiometric concentration with respect to said inhibitor and distilling the hydrocarbon alcohol from the reaction mixture as formed.

15. The method of claim 9 in which the sugar molecule is diacetone glucose.

16. The method of claim 9 in which the lower hydrocarbon ester is an ester of acrylic acid.

17. The method of claim 9 in which the lower hydrocarbon ester is an ester of methacrylic acid.

18. The process of preparing a polymerizable ester that comprises reacting diacetone glucose with a lower hydrocarbon ester of acrylic acid in the presence of a vinyl polymerization inhibitor and tetraisopropyl titanate as catalyst in an amount in excess of the stoichiometric concentration with respect to said inhibitor, distilling the hydrocarbon alcohol from the reaction mixture as formed and removing at least one of the acetone groups from the product of the reaction by hydrolysis.

19. The process of preparing a polymerizable ester that comprises reacting diacetone glucose with a lower hydrocarbon ester of methacrylic acid in the presence of a vinyl polymerization inhibitor and tetraisopropyl titanate as catalyst in an amount in excess of the stoichiometric concentration with respect to said inhibitor, distilling the hydrocarbon alcohol from the reaction mixture as formed and removing at least one of the acetone groups from the product of the reaction by hydrolysis.

20. The process of preparing a polymerizable ester that comprises reacting diacetone glucose with a lower hydrocarbon ester of itaconic acid in the presence of a vinyl polymerization inhibitor and tetraisopropyl titanate as catalyst in an amount in excess of the stoichiometric concentration with respect to said inhibitor and distilling hydrocarbon alcohol from the reaction mixture as formed.

21. A non-crosslinked polymer of an ester between a single hydroxyl group of a sugar molecule and an alpha, beta unsaturated polymerizable carboxylic acid of up to five carbon atoms, said sugar molecule being selected from the group consisting of six-carbon-atom sugars and five-carbon-atom alditols.

22. The polymer of claim 21 in which the sugar molecule is glucose.

23. A non-crosslinked polymer of glucose monoacrylate.

24. A non-crosslinked polymer of glucose monomethacrylate.

References Cited in the file of this patent

UNITED STATES PATENTS

| | | |
|---|---|---|
| 2,370,572 | Muskat et al. | Feb. 27, 1945 |
| 2,492,203 | Treadway | Dec. 27, 1949 |
| 2,715,121 | Glen et al. | Aug. 9, 1955 |
| 2,798,053 | Brown | July 2, 1957 |

OTHER REFERENCES

"Chemical Abstracts," vol. 43, 1949, col. 9078.